(12) United States Patent
Lewry et al.

(10) Patent No.: US 7,802,370 B2
(45) Date of Patent: Sep. 28, 2010

(54) ANTENNA FEED ANGULAR ALIGNMENT TOOL

(75) Inventors: Matthew Lewry, Edinburgh (GB); Junaid Syed, Kircaldy (GB); Keith Tappin, Dunfermline (GB); Graeme Thomson, Milnahort (GB)

(73) Assignee: Andrew LLC, Hickory, NC (US)

( * ) Notice: Subject to any disclaimer, the term of this patent is extended or adjusted under 35 U.S.C. 154(b) by 29 days.

(21) Appl. No.: 12/251,487

(22) Filed: Oct. 15, 2008

(65) Prior Publication Data

US 2010/0088911 A1    Apr. 15, 2010

(51) Int. Cl.
    *G01C 9/28* (2006.01)
(52) U.S. Cl. ......................................... 33/333
(58) Field of Classification Search ............... 33/333, 33/347, 354, 379, 365, 377, 370, 371
    See application file for complete search history.

(56) References Cited

U.S. PATENT DOCUMENTS

| | | | |
|---|---|---|---|
| 815,191 A * | 3/1906 | Martin ......................... 33/377 |
| 1,170,591 A * | 2/1916 | White .......................... 33/392 |
| 2,568,143 A | 9/1951 | Casper |
| 2,669,029 A * | 2/1954 | Ries .............................. 33/377 |
| 2,845,719 A * | 8/1958 | Thomiszer ................... 182/18 |
| 2,993,281 A | 7/1961 | Dock |
| 4,027,619 A | 6/1977 | Sturhan et al. |
| 4,092,882 A * | 6/1978 | Whitmore ................ 81/176.15 |
| 4,164,817 A * | 8/1979 | Walker ......................... 33/371 |
| 4,295,279 A | 10/1981 | Sienknecht |
| 4,559,714 A | 12/1985 | Wright |
| 4,622,837 A | 11/1986 | Bergman |
| 4,947,556 A * | 8/1990 | Peil .............................. 33/370 |
| 5,063,679 A * | 11/1991 | Schwandt .................... 33/347 |
| 5,233,760 A | 8/1993 | Patterson |
| 5,647,134 A | 7/1997 | Chou |
| 5,839,200 A | 11/1998 | Decesare |
| 6,138,368 A * | 10/2000 | Dzierzbicki .................. 33/371 |
| 6,209,371 B1 | 4/2001 | Guinn |
| 6,433,757 B1 | 8/2002 | Shrader |
| 6,526,667 B1 | 3/2003 | Staney |
| 6,568,095 B2 * | 5/2003 | Snyder ......................... 33/370 |
| 6,817,111 B1 | 11/2004 | Corrado |
| 6,839,973 B1 | 1/2005 | Woodward |
| 6,874,240 B1 | 4/2005 | Cruttenden |
| 6,985,057 B2 | 1/2006 | Lesutis |
| 2001/0046258 A1 | 11/2001 | Wise et al. |
| 2004/0040169 A1 * | 3/2004 | Davis ........................... 33/640 |
| 2005/0241165 A1 | 11/2005 | Ribatto |

* cited by examiner

*Primary Examiner*—Christopher W Fulton
(74) *Attorney, Agent, or Firm*—Babcock IP, PLLC

(57) ABSTRACT

An antenna feed angular alignment tool for an antenna feed and method of use. The tool having a body with a bore between a first end and a second end; a capsule, retained within the bore, having a first material and a second material enclosed within a cavity of the capsule. Coupling feature(s) integral with the body, proximate the first end are configured to rotationally couple with the antenna feed. The first material and the second material having different densities are movable within the capsule, indicating when the capsule and thereby the tool are aligned with a horizontal plane.

13 Claims, 4 Drawing Sheets

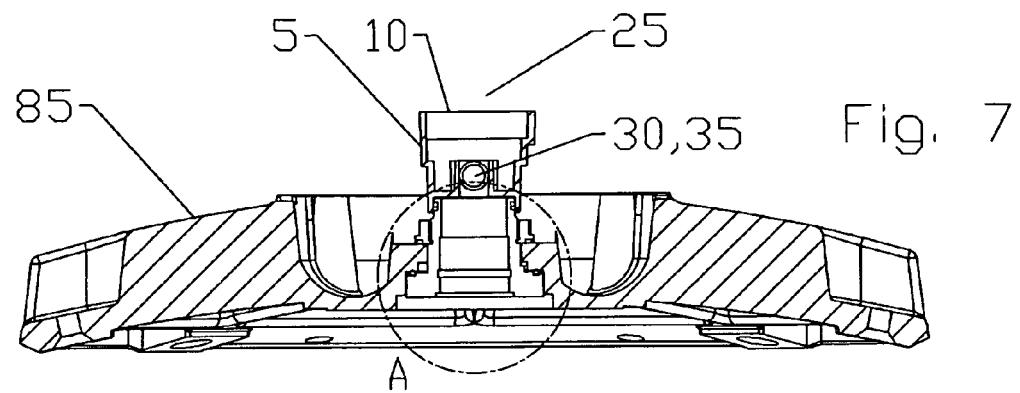
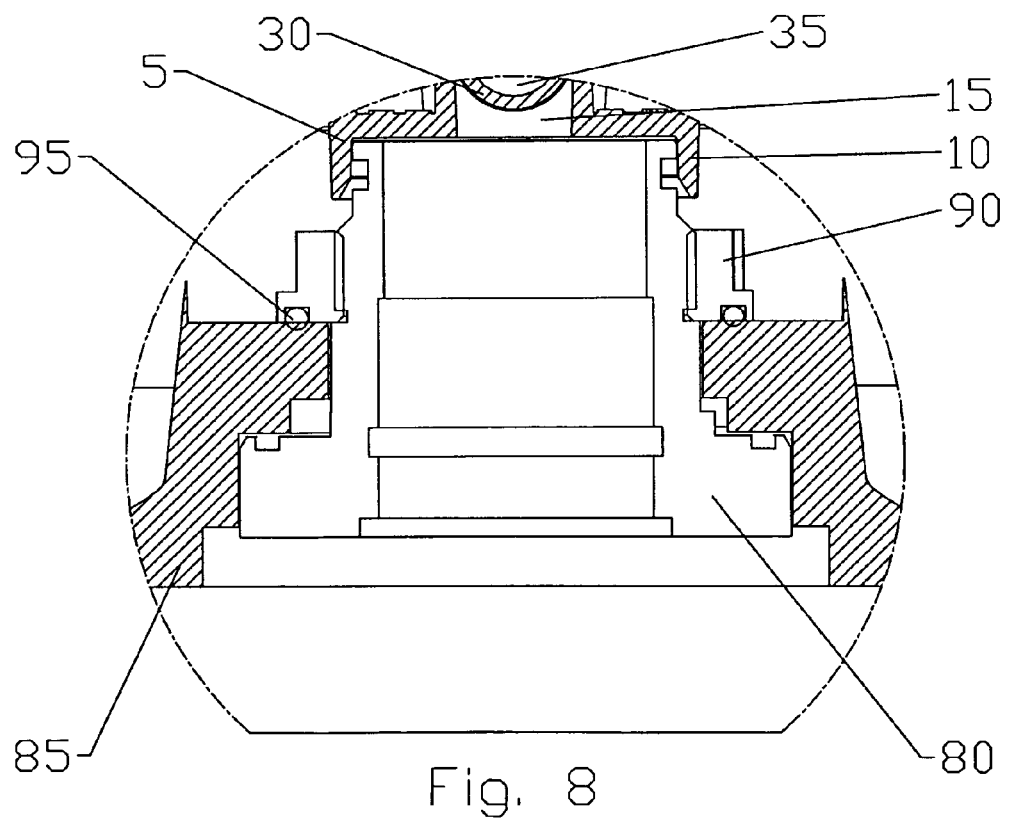

ANTENNA FEED ANGULAR ALIGNMENT TOOL

BACKGROUND

1. Field of the Invention

This invention relates to an antenna alignment tool. More particularly, the invention is a horizontal reference plane indicating antenna feed angular alignment tool.

2. Description of Related Art

The feed assembly of a reflector antenna is typically configured for rotation separate from the antenna base and or reflector for ease of angular alignment with and/or exchange between operation with vertical or horizontal polarization RF signals.

Prior antenna feed angular alignment tools attach to the entire feed assembly while the transceiver is connected. Feed alignment is performed by carefully adjusting the feed assembly to the rotation angle which optimizes the desired RF signal characteristics. Signal strength alignment methods require the system to be operational at both ends of the communication link and can be time-consuming procedures that require a field engineer upon the radio tower at the antenna and may also require the cooperation of multiple system operators.

Competition within the waveguide and RF equipment industries has focused attention upon improving electrical performance, reduction of the number of overall unique components, as well as reductions of manufacturing, installation and or configuration costs.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serves to explain the principles of the invention.

FIG. 7 is a cut-away side view along the line A-A of FIG. 3.

FIG. 8 is an enlarged view of area A of FIG. 7, some features of the antenna base omitted for clarity.

DETAILED DESCRIPTION

The inventors have recognized that antenna feed alignment to an easily referenced high precision common reference plane, independent of the antenna base mounting and or reflector dish orientation, greatly simplifies system configuration. Once the antennas comprising the communication link are aligned with each other directionally, correct polarization angular alignment may be quickly obtained between the antennas via the common reference plane, independent of the respective antenna mounting angular orientation. By eliminating the prior need to adjust the feed arrangement angular alignment with respect to the reflector and/or antenna base only upon assembly to an operational state, the transceiver assembly and associated signal and power connections thereto are no longer required to allow a significant range of angular rotation and or antenna base mounting flexibility, which simplifies the overall system design requirements and costs. Further, by configuring the tool to couple to the end of the feed waveguide, the tool overall size, material requirements and costs are minimized. Finally, applying different coupling features at alternate ends of the tool enables tool configuration for feeds of different sizes, allowing a single tool to be used for configuring multiple antenna families.

Figure 1:
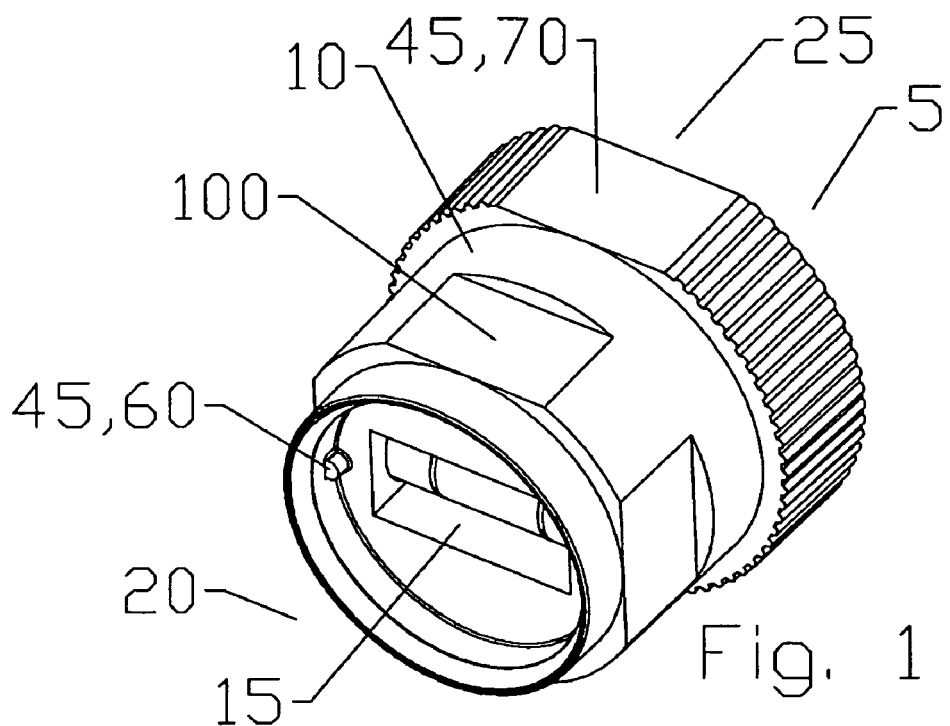
FIG. 1 is a schematic isometric angled front end view of an exemplary embodiment of an alignment tool.
Figure 2:
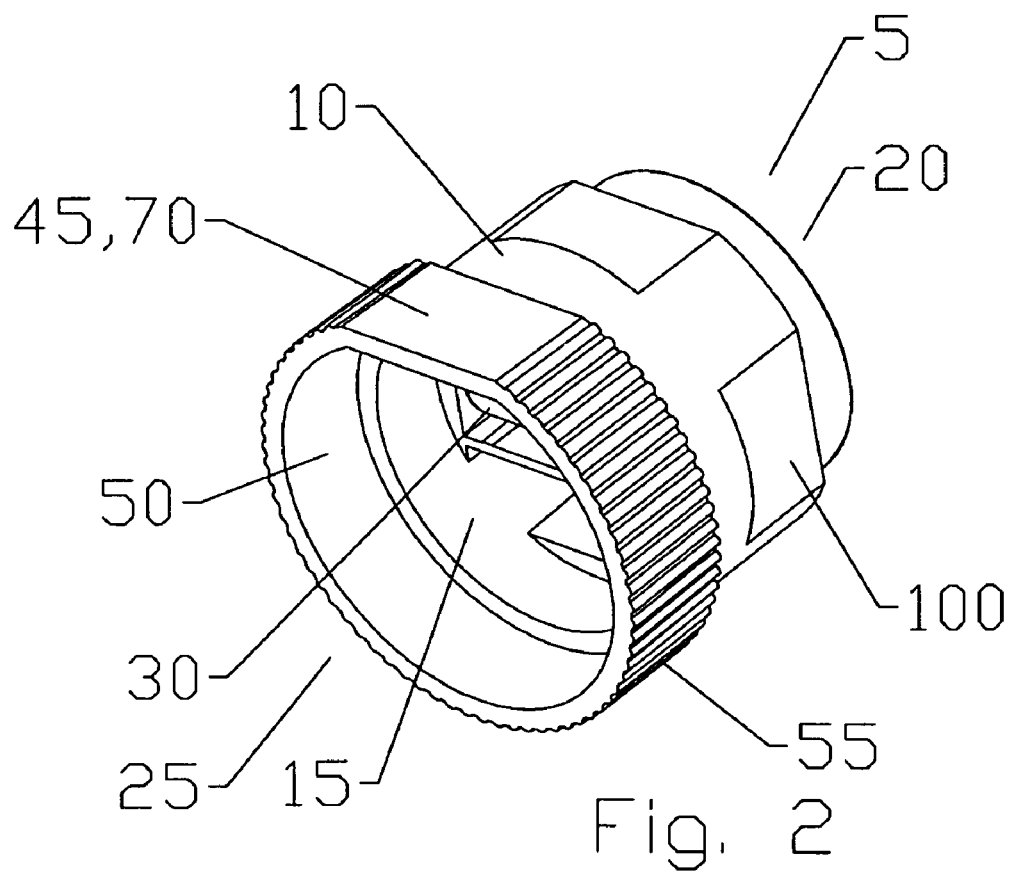
FIG. 2 is a schematic isometric angled back end view of the alignment tool of FIG. 1.
Figure 3:
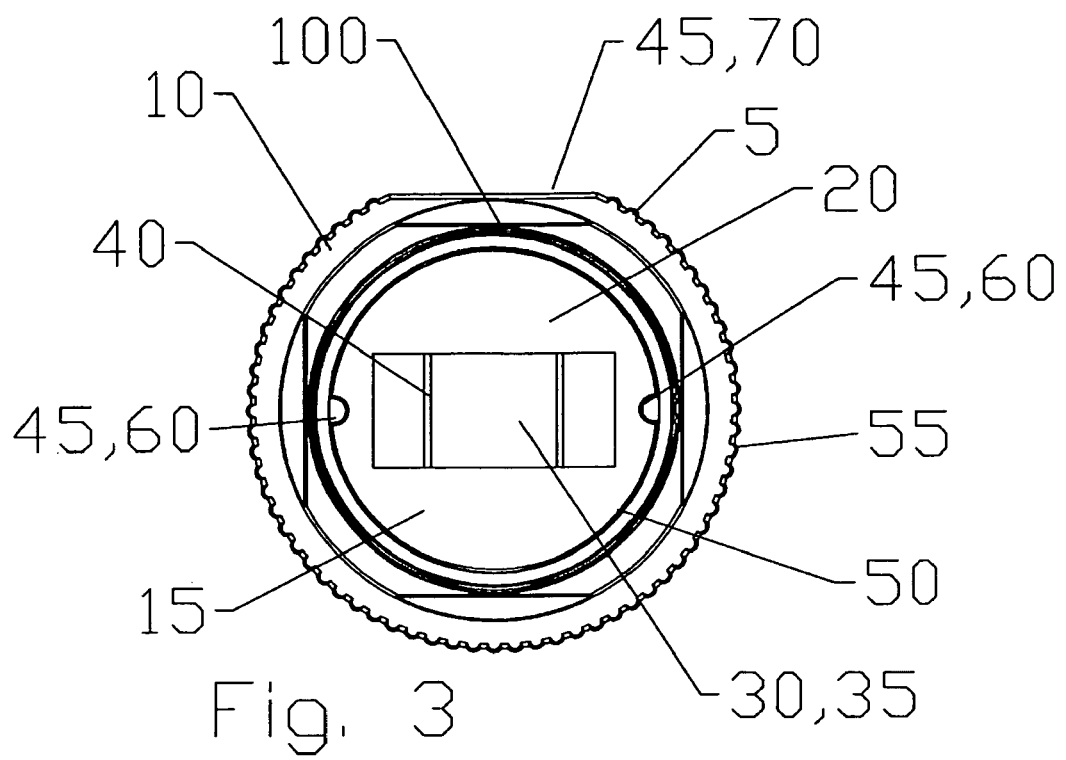
FIG. 3 is a schematic front view of the alignment tool of FIG. 1.
Figure 4:
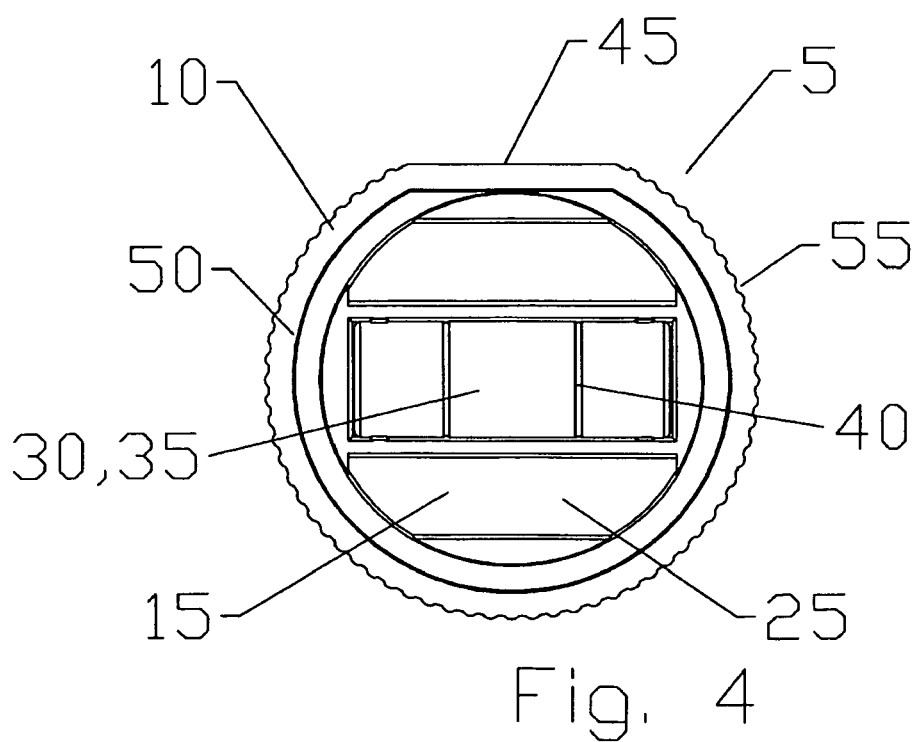
FIG. 4 is a schematic back view of the alignment tool of FIG. 1.

An exemplary embodiment of an antenna feed alignment tool 5 is shown in FIGS. 1-4. The tool 5 is formed as a body 10 provided with a bore 15 between a first end 20 and a second end 25, for example by machining a metal blank, casting or injection molding from a polymer material. Within the bore 15, a spirit level, also known as a bubble level, capsule 35 is positioned, preferably centered upon the bore 15, with a capsule 30 longitudinal axis normal to a bore 15 longitudinal axis between the first end 20 and the second end 25.

A typical capsule 30 may be formed by introducing a first material and a second material into a cavity 35 within the capsule, for example a liquid and a gas bubble, respectively, before permanently sealing the cavity 35. The enclosed first and second materials should be immiscible and of significantly different densities. By force of gravity the first or second material having a lower density, in this example the gas bubble, will rise towards a top of the cavity 35, the top determined by the instant orientation of the capsule 30. Further material selection criteria may include long term stability, resistance to freezing and acceptable expansion and contraction characteristics in response to expected temperature variation exposure for the capsule 30 during tool use. The capsule 30 is preferably a transparent material such as glass or polymer. For ease of viewing the position of, for example, the gas bubble through the capsule 30 in low light conditions, for example, the liquid may be selected from a range of available luminous liquids as commonly applied to conventional carpenter's bubble level capsules. The capsule 30 may be configured with gradient marking(s) 40 which when the first or second material having a lower density is between the gradient marking(s) 40, indicates, as in a conventional carpenter's bubble level, that the capsule 30 is level with the horizontal plane.

The first and second ends 20, 25 are configured to rotationally couple with the desired antenna feed(s) via coupling feature(s) formed along inner and or outer diameters 50, 55 of the body 10 and/or at the edges of the first and second ends 20, 25. The first end 20 is demonstrated with coupling feature(s) 45 formed as a pair of inward projection(s) 60 on the inner diameter 50 of the bore 15, best shown in FIG. 3, that are configured to mate with corresponding coupling features in the form of slots formed in the antenna feed end outer diameter. Alternative coupling feature(s) are demonstrated at the second end 25, formed as a ribbed outer diameter 55 collar 65 with a flat 70, best shown in FIG. 4, configured to mate with a coupling feature in the form of a corresponding flat surface of the intended antenna feed end. The coupling feature(s) 45 of the first and second ends 20, 25 may be configured for coupling with antenna feeds having different coupling configurations and/or by adding steps or shoulders to the inner or outer diameter with antenna feed ends having different end dimensions, i.e. for different antenna families requiring coupling with larger or smaller diameter antenna feed ends. The coupling feature(s) 45 are arrayed with respect to the orientation of the antenna feed. Similarly, the orientation of the capsule 30 within the bore 15 is fixed. Therefore, if the capsule 30 displays a tool 5 horizontal orientation indication when the tool 5 is coupled to the antenna feed, the antenna feed will also be at a horizontal orientation. Alternatively, the coupling feature(s) 45 may be arranged to display a tool 5 horizontal orientation indication when the antenna feed is in a vertical orientation.

Figure 5:
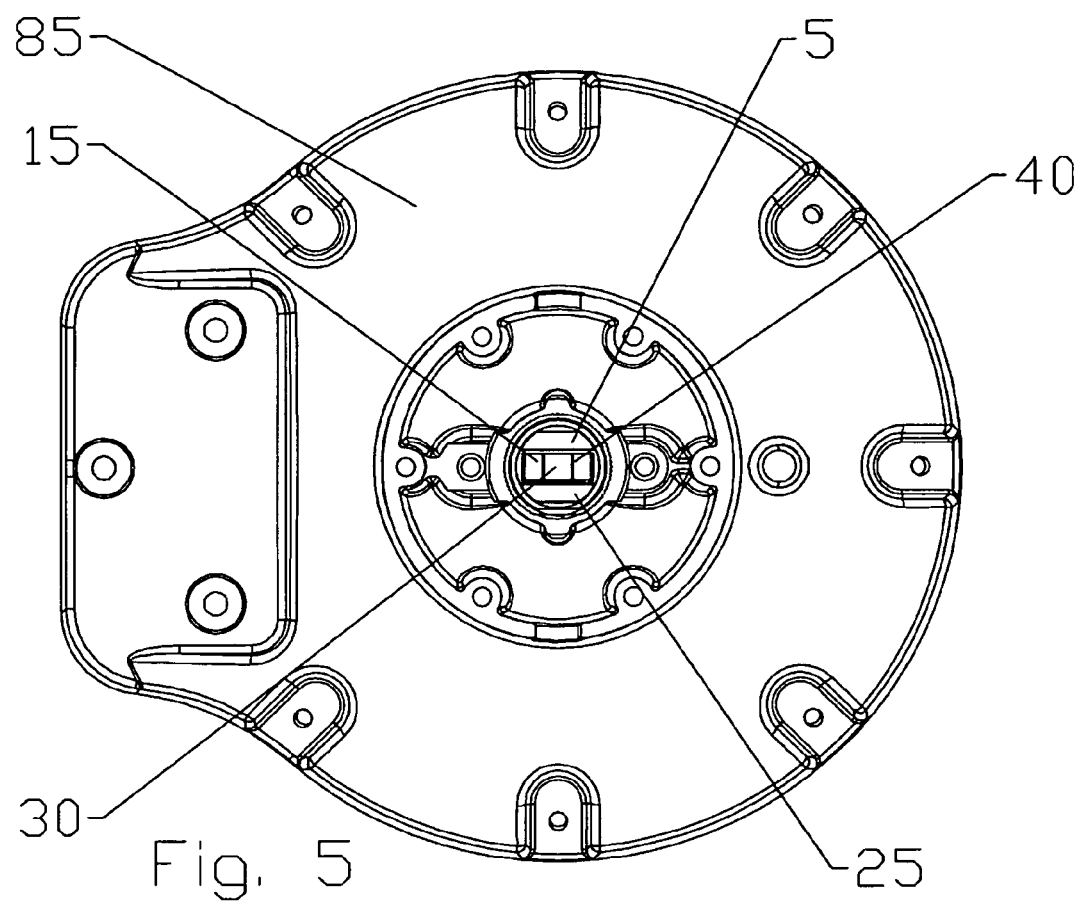
FIG. 5 is a schematic end view of the tool of FIG. 1 coupled to the antenna feed end of a reflector antenna, portions of the reflector antenna omitted for clarity.
Figure 6:
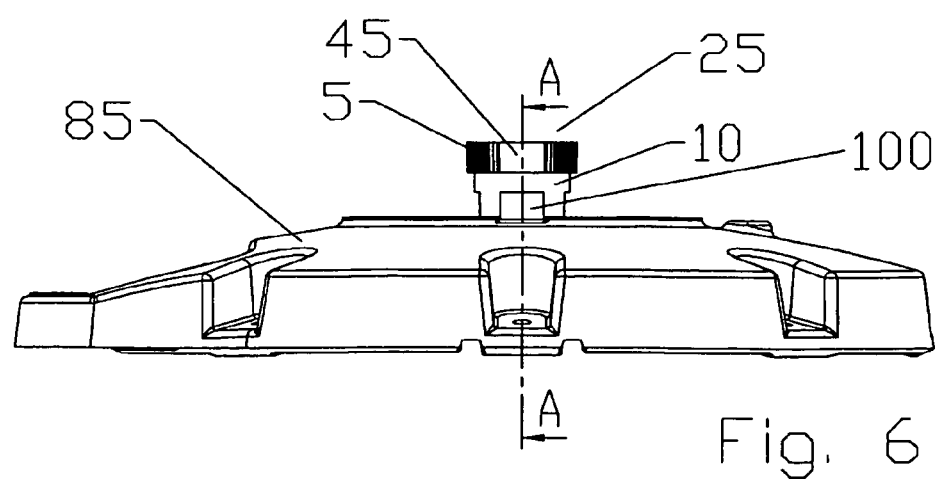
FIG. 6 is a schematic side view of FIG. 3.

Antenna feed alignment for use with a horizontal polarization RF signal via the tool 5 is demonstrated in greater detail in FIGS. 5-8 showing details of the tool 5 attachment and rotational adjustability of the antenna feed 75 while the tool 5 is coupled with the antenna feed 75. The antenna feed 75 coupling end is typically a feed hub 80 rotatable with respect to the antenna base 85, lockable at a desired angle by tightening a lock nut 90. With the lock nut partially loosened, a sealing gasket 95 typically provides suitable friction between the antenna base and the feed hub to minimize introduction of alignment errors while still enabling angular adjustment of the antenna feed via rotation of the tool coupled with the feed hub. Flats or other tool coupling surface(s) 100 formed in the body 10 enable secure tightening of the lock nut 90 when the desired angular alignment has been reached, without disturbing the selected angular alignment. The antenna feed 75 may be provided with alternative corresponding feed coupling features for alignment, for example, with vertical polarization. That is, the alternative corresponding feed coupling features are offset from the coupling features for the horizontal polarization by ninety degrees. Alternatively, dual sets of coupling feature(s) 45 may be formed, offset by ninety degrees, on the first and second ends 20, 25.

In use, the antenna is mounted and directionally aligned, for example by bore sighting. The tool 5 is then coupled to the antenna feed 75 and with the locknut 90 slightly loosened, the antenna feed 75 rotated until the desired rotation angle is indicated by the capsule 30. While holding the tool 5 stationary, for example via a wrench applied to the tool coupling surface(s) 100, the lock nut 90 is tightened to fix the antenna feed 75 in place. With a first apparatus end of the communications link directionally and angularly aligned, the second apparatus end may be similarly aligned at a later time of convenience, before the communications link is activated (also at a later time of convenience).

One skilled in the art will recognize the significant installation and configuration efficiencies provided by the invention, especially the elimination of the prior requirement of angular alignment by signal strength monitoring of an active communications link. Further, because the first and second ends of the tool 5 may be configured for different antenna families the tool is extremely versatile. Easily manufactured, for example by injection molding, the tool is also inexpensive.

Table of Parts

| | |
|---|---|
| 5 | tool |
| 10 | body |
| 15 | bore |
| 20 | first end |
| 25 | second end |
| 30 | capsule |
| 35 | cavity |
| 40 | gradient marking |
| 45 | coupling feature |
| 50 | inner diameter |
| 55 | outer diameter |
| 60 | inward projection |

-continued

Table of Parts

| | |
|---|---|
| 65 | collar |
| 70 | flat |
| 75 | antenna feed |
| 80 | feed hub |
| 85 | antenna base |
| 90 | lock nut |
| 95 | gasket |
| 100 | tool coupling surface |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. An antenna feed angular alignment tool for an antenna feed end, comprising:
    a body having a bore between a first end and a second end;
    a capsule, retained within the bore, having a first material and a second material enclosed within a cavity of the capsule; and
    coupling feature(s) integral with the body, proximate the first end, configured to rotationally couple with the antenna feed end;
    the first material and the second material having different densities;
    the second end also provided with coupling features;
    the coupling feature(s) of the first end and the coupling feature(s) of the second end are configured for coupling with a first antenna feed and a second antenna feed, the first antenna feed and the second antenna feed having different antenna feed diameters.

2. The tool of claim 1, wherein the first material is a liquid and the second material is a gas.

3. The tool of claim 2, wherein the liquid is luminous.

4. The tool of claim 1, wherein the capsule is positioned with a capsule longitudinal axis normal to a bore longitudinal axis.

5. The tool of claim 1, wherein the coupling feature(s) are protrusions projecting inward from the inner diameter of the bore.

6. The tool of claim 1, wherein the coupling feature is a flat provided in the circumference of the body.

7. The tool of claim 1, wherein the second end is provided with coupling feature(s).

8. The tool of claim 7, wherein the coupling feature(s) of the first end and the coupling feature(s) of the second end are configured for coupling to the antenna feed at an angular orientation 90 degrees apart.

9. The tool of claim 1, further including indicia on the capsule arranged to indicate when the first and second material within the capsule are oriented such that the capsule is parallel with a horizontal plane.

10. The tool of claim 9, wherein the indicia is arranged on either side of a midpoint of the capsule.

11. An antenna feed angular alignment tool for an antenna feed end, comprising:
    a body having a bore between a first end and a second end;
    a capsule, retained within the bore, is positioned with a capsule longitudinal axis normal to a bore longitudinal axis, having a liquid and a gas enclosed within a cavity of the capsule; and
    coupling feature(s) integral with the body, proximate the first end and the second end, configured to rotationally couple with the antenna feed end;
    the coupling feature(s) of the first end and the coupling feature(s) of the second end are configured for coupling with a first antenna feed and a second antenna feed, the first antenna feed end and the second antenna feed end having different antenna feed end diameters.

12. A method for angular alignment of an antenna feed end, comprising the steps of:
    rotationally coupling a tool provided with a capsule filed with a first material and a second material to the antenna feed, via at least one coupling feature of the tool;
    the first material and the second material having different densities; and rotating the tool and thereby the antenna feed end until the first material and the second material within the capsule are oriented within the capsule to indicate the capsule is parallel to a horizontal plane.

13. The method of claim 12, wherein the indication that the capsule is parallel to the horizontal plane occurs when the one of the first material and the second material having the lowest density is situated at a midpoint of the capsule.

* * * * *